F. G. COTTRELL & J. B. SPEED.
SEPARATING AND COLLECTING PARTICLES OF ONE LIQUID SUSPENDED IN ANOTHER LIQUID.
APPLICATION FILED MAY 20, 1909. RENEWED OCT. 12, 1910.
987,115.
Patented Mar. 21, 1911.
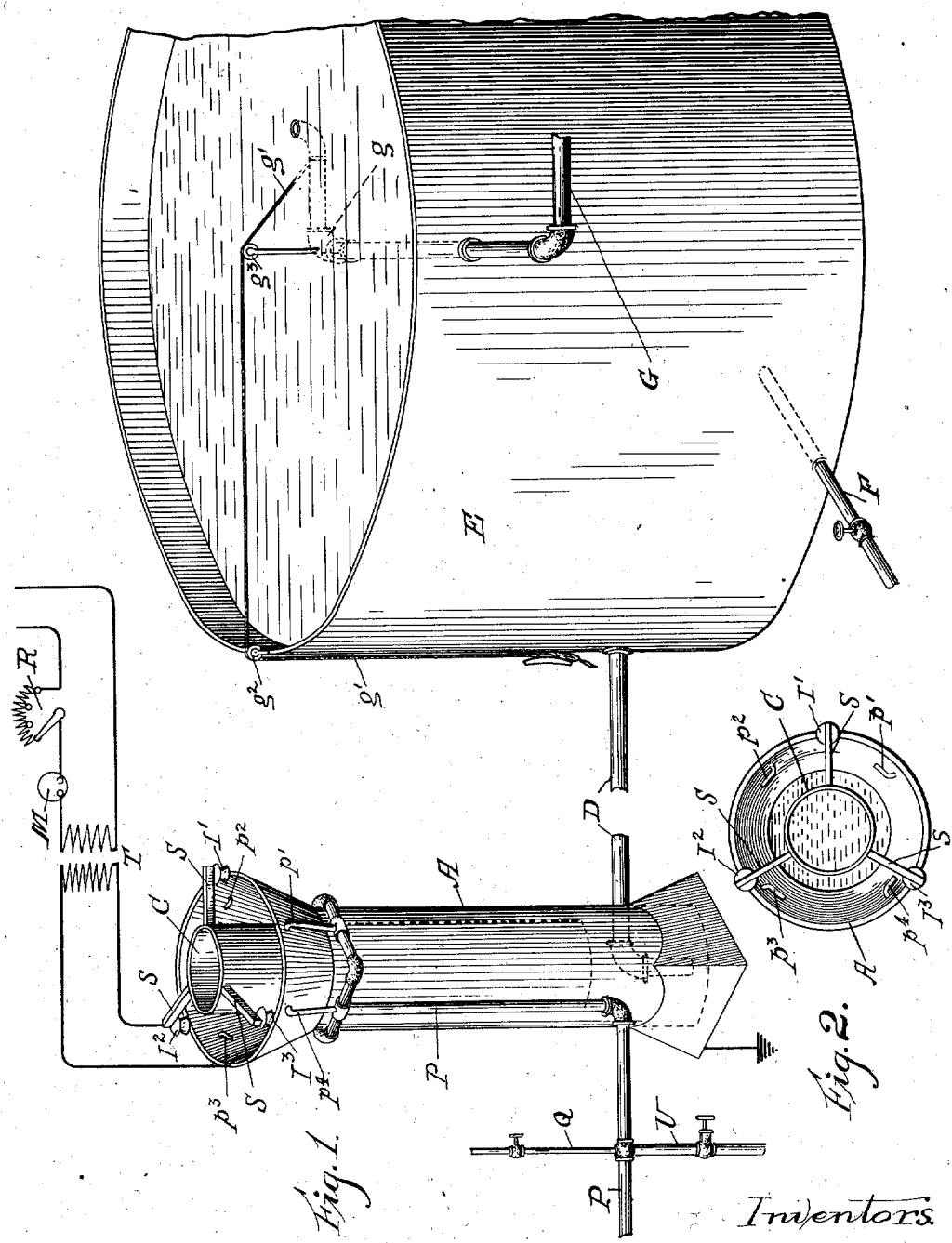

UNITED STATES PATENT OFFICE.

FREDERICK GARDNER COTTRELL AND JAMES BUCKNER SPEED, OF BERKELEY, CALIFORNIA, ASSIGNORS, BY MESNE ASSIGNMENTS, TO PETROLEUM RECTIFYING COMPANY, OF SAN FRANCISCO, CALIFORNIA, A CORPORATION OF CALIFORNIA.

SEPARATING AND COLLECTING PARTICLES OF ONE LIQUID SUSPENDED IN ANOTHER LIQUID.

987,115.          Specification of Letters Patent.     Patented Mar. 21, 1911.

Application filed May 20, 1909, Serial No. 497,167. Renewed October 12, 1910. Serial No. 586,794.

*To all whom it may concern:*

Be it known that we, FREDERICK GARDNER COTTRELL and JAMES BUCKNER SPEED, citizens of the United States, residing at Berkeley, in the county of Alameda and State of California, have invented certain new and useful Improvements in Separating and Collecting Particles of One Liquid Suspended in Another Liquid, of which the following is a specification.

Our invention relates to the art of separating mechanical mixtures of liquids such as emulsions of water in oil, and to methods or processes of such separation.

In order to present our invention in a concrete and easily understandable form, we will, at the outset, describe it as applied to the separation and removal of water particles from crude petroleum, but it is to be understood that we do not limit our claims to this particular case.

Much of the crude petroleum as it comes from the wells contains drops of water, varying in size from those easily visible to the naked eye to a minuteness lying at the extreme range of vision of the most powerful microscope. In some cases this water settles out upon standing, and this may be accelerated by heating the mass, and by treating it in various forms of centrifugal separators. The first of these methods is very generally employed and the centrifugal treatment has received a great deal of study and has to-day a certain limited applicability, but, at present, there still remains a large class of oils that cannot be economically freed from water without distillation. These are largely oils in which the water is in very small globules often less than one thousandth of an inch in diameter and behaving as if surrounded with a membrane, resisting coalescence of the drops. In many cases, however, distillation is prohibitively expensive, and even where it is desired eventually to distil the oil it is of great technical advantage to be able to first remove suspended water, as its presence tends to produce explosive boiling and running over of the still contents, on the one hand, and, on the other hand, to fouling of the still bottoms, eventually leading to bad heat conductivity carbonization, and, finally, destruction of the materials of construction of the still itself.

Many natural petroleums, as taken from the wells, contain from $\frac{1}{2}\%$ to $50\%$ of water in form of small drops (*i. e.* emulsions) and after being allowed to stand for months still hold a great proportion of the water in suspension. We have found that when the same emulsions are subjected to the action of high potential electric charges in the manner described below, they are rapidly deëmulsified, the water settling to the bottom of the vessel, and collecting into large masses which can be readily withdrawn, leaving the oil dry. As much of the mechanically suspended solids in the oil are carried in or on these water globules, the process also eliminates a great proportion of these, and in fact where it is desired to remove suspended solids from an oil containing no water globules this may be accomplished by churning the oil up with water to such an emulsion, and then applying the treatment as described below, the solids being largely carried down by the water droplets in their coalescence, although the same treatment applied to the dry oil containing the dry solids in suspension without the water, occasions little, if any, removal of said solids. The mechanism of the phenomenon may be followed under the microscope, if a thin layer of emulsified oil be spread on a slip of glass, or better still, on a slab of paraffin, and two fine wires forming the opposite poles of a high potential source of electricity be immersed in the oil, with their tips separated by a distance considerably greater than that at which disruptive discharge would take place. Under these conditions the water drops or globules in the oil immediately commence to arrange themselves in chains extending out from each electrode toward the other, strongly suggesting filaments of yeast cells as seen in a fermenting liquor. Rapidly following the formation of the chains comes a coalescence of the adjacent globules in each chain, and as the chain accumulates new particles, chiefly at the free ends, the drops nearest the electrodes become the largest, successive members of the chain diminishing fairly regularly in size as the free end is approached. The process of coalescence of the water soon reaches a point where the latter rapidly separates out in irregular masses or films on the electrodes and supporting slide.

The above phenomenon may be obtained with either direct or alternating current source of electricity, but for technical purposes, at least, the latter has decided advantages. In case direct current is used there is superimposed upon the above described phenomenon a second, viz., the streaming bodily of the liquid from one electrode to the other, due to cataphoresis along the more intense force lines, which tends to disrupt the chains of globules and prevent their formation and coalescence. This distinction between the phenomenon as produced by alternating and direct current must be clearly recognized in distinguishing our process from the various applications which have heretofore been made of the phenomenon of cataphoresis or electric endosmose which depend upon causing particles suspended in liquids to migrate from one electrode of constant polarity toward another of opposite polarity, and are, therefore, limited to direct current systems. In the process here described and claimed these phenomena are merely incidental, and, sometimes, a positive disadvantage, as we rely instead upon the coalescing action possessed also by the alternating current, where it is observed stripped of the direct migrations found in the case of the direct current. The process must, further, be distinguished from those among which fall, for example, the various applications of electric current to the purification of water which depend on (1) removal of dissolved electrolytes by ionic migration; (2) acceleration of sedimentation of suspended matter by production of chemical compounds at the electrodes by electrochemical reactions; and (3) killing of organisms by electric current. In the present process we are dealing with a typical nonconductor, oil, in which are suspended globules of a substance which compared with the oil has a very appreciable conductivity viz.—water often carrying considerable saline matter in solution. These globules are thereby subjected to electrostatic forces dependent upon the relative potentials and dielectric constants of the materials in contact, and caused to coalesce into masses which may be readily removed from the body of the oil by well known processes such as settling.

In addition to its greater actual effectiveness, the alternating current presents the further important technical advantages, that it is far easier with it to obtain high voltages which are most advantageous for handling large masses of material on account of the greater distance between the electrodes which they permit, and, also, the danger of electrolytic corrosion of the apparatus is eliminated by the use of the alternating, rather than of the direct current.

Having thus outlined certain of the basic principles upon which the present method is founded, we will next describe an apparatus by the use of which these principles may be carried out in practice, and then with the concrete illustration as a basis, proceed to discuss some of the more important details of the process.

Referring to the accompanying drawing—Figure 1 is a general view of a complete set of apparatus, diagrammatically illustrated, by means of which the process may be carried out. Fig. 2 is a plan of the electrically treating vessel.

A is a vessel, containing the oil undergoing the electrical treatment and itself serves as one of the electrodes, being connected to the ground and also to one of the high potential terminals of the step-up transformer T. The other high potential terminal of the transformer is connected to the electrode C represented in the figure as an inner shell concentric with the wall of the vessel A and supported thereon by the insulators $I'$, $I^2$, $I^3$, and the spider S. The low potential terminals of the transformer are connected through the ammeter M and regulating rheostat R with the electric service mains, as, for example, an incandescent lighting circuit. The oil and water mixture to be treated is received through the pipe P, and is heated to any desired temperature for the purpose of decreasing its viscosity, by the injection of live steam through the pipe Q. The other inlet U serves to introduce either oil already treated, or sludge or even water, as described below. The mixture enters the top of the treating vessel through the tangentially directed jets $p'$, $p^2$, $p^3$, $p^4$ thus insuring a thorough mixing and uniform composition at the top of the treating vessel, as well as occasioning a steady motion of the surface of the liquid in the funnel shaped top at right angles to the lines of force of the electric field, thus lessening the tendency to electrical leakage, and break-down in the surface layers. The material thus supplied to the top of the vessel flows uniformily down through the annular space around the inner electrode where the electrical treatment chiefly occurs, and is finally carried out of the bottom of the treating vessel A through the pipe D which is of large enough diameter to insure a quiet flow free from churning that might tend to reëmulsify the separating liquids. The pipe D discharges into the settling tank E, preferably its lower portion, where the final separation of the oil and water is accomplished, the latter being drawn off together with any residual sludge, through the outlet F and the purified oil through the outlet G which latter is preferably so constructed as to allow of a vertical adjustment of its intake end within the tank, as indicated in the figure by the flexible joint $g$, and the adjusting cord $g'$ passing over the pulleys $g^2, g^3$. As for any given rate of flow, the level in the tank E also determines the level in the vessel A, this adjustment serves to control the level of material in vessel A.

The chief reason for adopting the funnel shaped top of the vessel A lies in our discovery that it is essential for the proper working of the method not to allow the essentially active surfaces of the electrodes (by which term is to be understood those portions which are in sufficient proximity to the electrode of opposite polarity to be really efficient in producing coalescence of the intervening suspended particles) to emerge from the liquid undergoing treatment into the air, or even come too close to the surface of contact between air and liquid in close proximity to one another; for when this happens there is a decided tendency for the partially agglomerated water to collect in these surface layers and cause short circuiting of the electrodes. Care must, therefore, be taken to have the active portion of the electrodes deeply immersed in the liquid under treatment, as is the case in the illustration. On account of the funnel shaped top of the vessel, the only portion of the suspended electrode C which comes into these surface layers is at so much greater distance from the wall of the vessel than its deeper active portion, as to occasion no difficulty. In this same connection, a further advantage of the above described arrangement lies in the fact that the upper surface of the material in the treating vessel is continually renewed and stirred by the inflow of untreated oil which is a better insulator than that which is in the incipient stages of chain building and coalescence in the deeper parts of the vessel, thus still further reducing the tendency to surface leakage. The downward direction of flow between the active electrode surfaces is also an important detail as it prevents the danger of short circuits from an accumulation of water-rich masses between the electrodes which are very apt to result if an upward flow is used, as in this latter case the gravitative tendency of the enlarged droplets is partly offset by the buoyant action of the upward current of liquid.

Another feature of the above described procedure which deserves special mention is the heating of the oil by injection of steam directly into it. This method of heating although one of the most efficient and convenient possible, is inadvisable in most cases other than the present, because of the finely emulsified condition in which the condensed water is apt to be left in the oil. In the present process this feature is so specifically provided for by the subsequent electrical treatment as to present no drawback, and hence the combination with the rest of the process of this means of rendering the oil more fluid and adaptable to the electrical and settling treatment becomes an essential part of our improvements in the method of treatment.

Still another important feature which our investigation has brought out is the fact that in order to prevent the formation of short circuits within the liquid, due to chains of water-globules forming from one electrode to the other, it is necessary to prevent the potential difference between the electrodes from falling too low. This may be well illustrated as follows:—If we start with a small resistance in the rheostat R and the proper electromotive force applied for any given character of oil and water mixture and arrangement of electrodes, the ammeter M will show an essentially constant current with only slight irregular variation, or, at most, only occasional momentary variations of any appreciable magnitude, but if the rheostat resistance be gradually increased, a condition will finally be reached where the ammeter reading rapidly increases to several times its original value, thus greatly increasing the power consumption, while, at the same time, the potential difference between the electrodes falls, and the effectiveness of the treatment is reduced. If the resistance in the rheostat is then reduced to its original value, the current, after a momentary further increase, quickly falls back to the original small value it had at the outset, and the original potential and efficiency of the electrodes is reëstablished. A small resistance in series with the primary is advantageous as protection against destructive momentary overloads. We believe the explanation of this phenomenon to lie in the disruptive forces either electrostatic or thermal which the high potential can exert on these chains of water particles when closed, or just as they are closing between the electrodes. If the potential falls too low then these forces are overcome by the attractive forces between the particles and permanent electrolytically conducting chains are established between the electrodes thereby reducing the potential difference of the latter still more and wasting a large part of the supplied energy in useless heat of electrolytic conduction.

In many cases a single treatment as above outlined is all that is required but when necessary the process may be repeated in a separate vessel either with or without intermediate settling and applied to either or both the oil drawn off at G in the first treatment or any oil and sludge carried off at F with the water. Or this latter material may be returned through the pipe U and thoroughly commingled with the inflowing oil through the jets.

Another modification of the process which may prove especially useful in case of very high water content of the original oil, consists in returning a considerable portion of the purified oil from G to U and thus diluting up the oil to be treated. This also facilitates the handling of such oil supplies as may vary considerably from time to time in their water content inasmuch as by regulation of the amount of the dry oil thus added, the conditions within the treating tank may be maintained constant.

The apparatus herein shown, forms no part of the present application and is not herein claimed, as it constitutes a part of the subject matter of a contemporaneous application, Serial Number 497,168 filed May 20, 1909.

It is of course to be understood that the particular arrangement of electrodes and general mode of construction of apparatus above illustrated and described are merely illustrative and that we do not limit ourselves to this or any other specific form of apparatus for carrying out the method here described and claimed.

Having thus described our invention what we claim as new and desire to secure by Letters Patent is:—

1. The improvement in the art of separating and collecting particles of one liquid suspended in another liquid which latter is essentially a non-conductor of electricity, consisting in bringing the material to be treated between electrodes connected to a source of electricity of sufficient voltage to produce coalescence of the suspended particles in such wise as to cause the rapid separation of the two liquids throughout the body of the mixture and, at the same time, prevent the coalescing globules from forming complete chains short circuiting the electrodes.

2. The improvement in the art of separating and collecting particles of one liquid suspended in another liquid which latter is essentially a non-conductor of electricity, consisting in bringing the material to be treated between electrodes connected to a source of alternating current of sufficient voltage to produce coalescence of the suspended particles in such wise as to cause the rapid separation of the two liquids and, at the same time, prevent the coalescing globules from forming complete chains short circuiting the electrodes.

3. The improvement in the art of separating and collecting particles of one liquid suspended in another liquid which latter is essentially a non-conductor of electricity, consisting in causing the material to be treated to flow between electrodes whose essentially active surfaces are immersed below the surface layers of said material, and are connected to a source of electricity of sufficient voltage to produce coalescence of the suspended particles in such wise as to cause the rapid separation of the two liquids throughout the body of the mixture and, at the same time, prevent the coalescing globules from forming complete chains short circuiting the electrodes.

4. The improvement in the art of separating and collecting particles of a liquid suspended in another liquid relatively lighter and which is essentially a non-conductor of electricity, which consists in causing the material to be treated to flow downward between electrodes whose essentially active surfaces are immersed below the surface layers of said material, and are connected to a source of electricity of sufficient voltage to produce coalescence of the suspended particles in such wise as to cause the rapid separation of the two liquids throughout the body of the mixture and, at the same time, prevent the coalescing globules from forming complete chains short circuiting the electrodes.

5. The improvement in the art of separating and collecting particles of a liquid suspended in another liquid relatively lighter and which is essentially a non-conductor of electricity, which consists in causing the material to be treated to enter the electrical treating vessel in the form of streams impinging upon the upper surface of the liquid contents of the vessel in such manner as to cause a stirring of said surface and thorough mixing of said inflowing material, and thence to flow downward between electrodes whose essentially active surfaces are immersed below the surface layers of said material, and are connected to a source of electricity of sufficient voltage to produce coalescence of the suspended particles in such wise as to cause the rapid separation of the two liquids and, at the same time, prevent the coalescing globules from forming complete chains short circuiting the electrodes.

6. The improvement in the art of separating and collecting particles of a liquid suspended in another liquid relatively lighter and which is essentially a non-conductor of electricity, which consists in first decreasing the viscosity of the mixture by the direct injection into it of live steam, and then bringing the resulting material between electrodes connected to a source of electricity of sufficient voltage to produce coalescence of the suspended particles in such wise as to cause the rapid separation of the two liquids and, at the same time, prevent the coalescing globules from forming complete chains short circuiting the electrodes.

7. The improvement in the art of separating and collecting particles of one liquid suspended in another liquid which latter is essentially a non-conductor of electricity, which consists in first passing the material to be treated between charged electrodes substantially as described, and then causing said material to flow quietly and without churning action into a settling reservoir from the top of which the lighter, and from the bottom of which the heavier of the two liquids are, respectively, withdrawn.

8. The improvement in the art of separating and collecting particles of one liquid suspended in another liquid which latter is essentially a non-conductor of electricity, consisting in, first, commingling the material to be treated with material from which the suspended particles have already been removed and, then, bringing the mixtures, thus formed, between electrodes connected to a source of electricity of sufficient voltage to produce coalescence of the suspended particles in such wise as to cause the rapid separation of the two liquids and, at the same time, prevent the coalescing globules from forming complete chains short circuiting the electrodes.

In testimony whereof we have signed our names to this specification in the presence of two subscribing witnesses.

FREDERICK GARDNER COTTRELL.
JAMES BUCKNER SPEED.

Witnesses:
WM. F. BOOTH,
D. B. RICHARDS.